Oct. 7, 1958 H. E. SMITH 2,854,733
APPARATUS FOR SAWING ELONGATED STOCK
Filed May 23, 1955 9 Sheets-Sheet 1

INVENTOR
HAROLD E. SMITH
BY
ATTORNEY

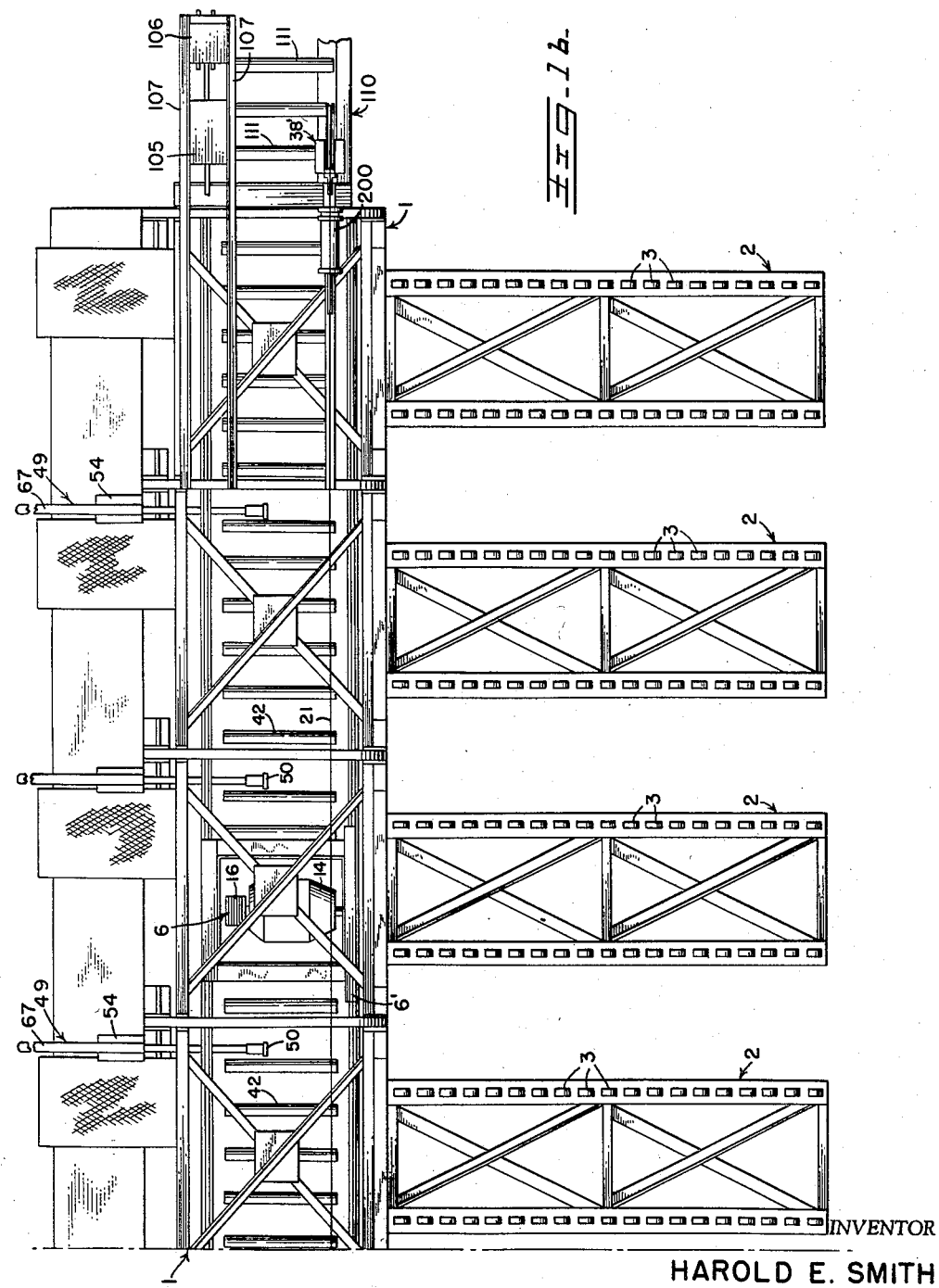

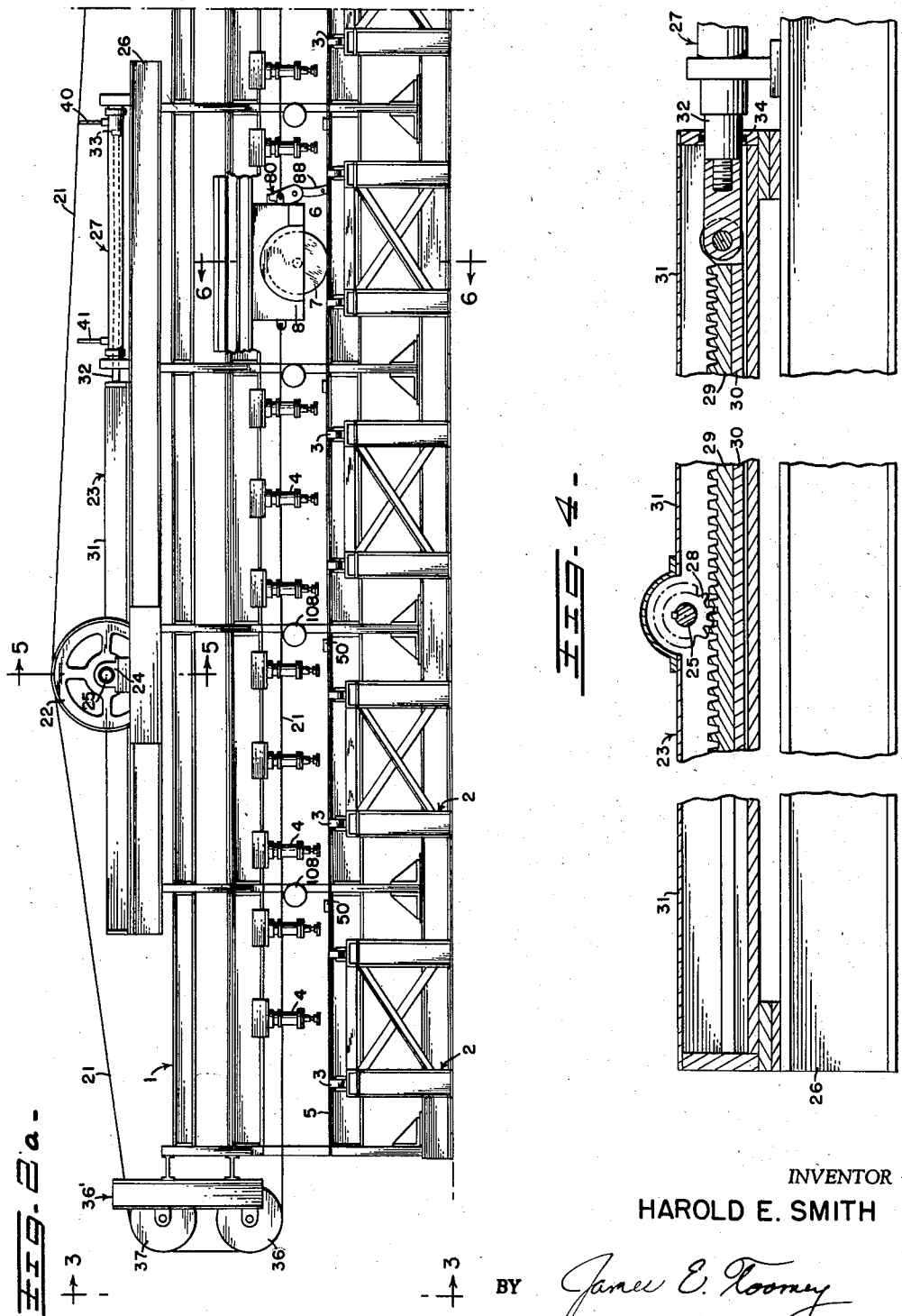

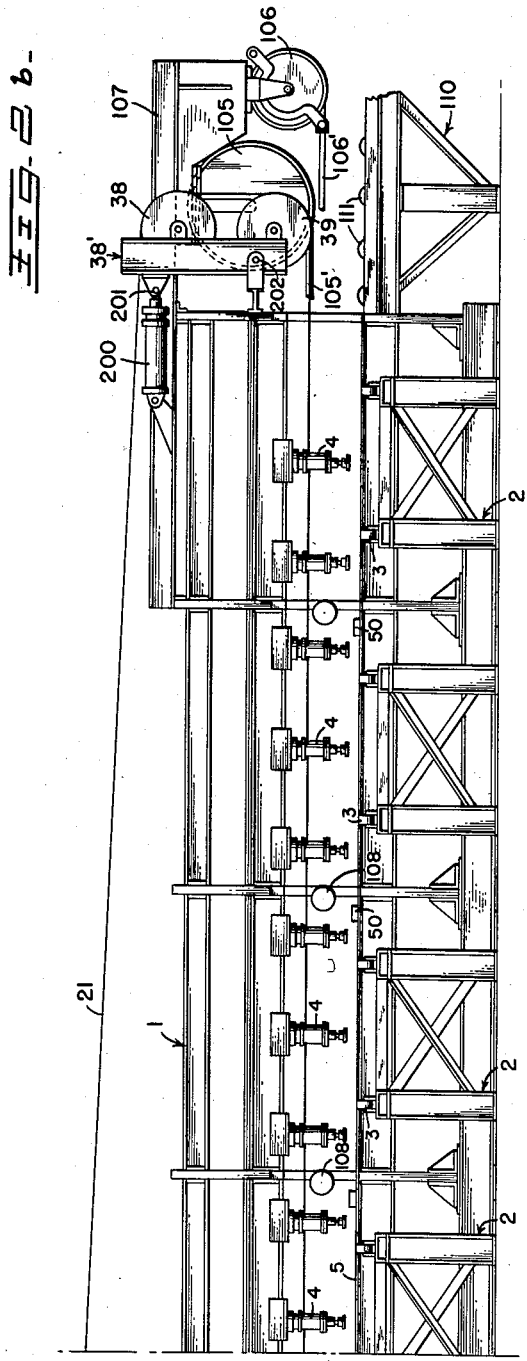

Oct. 7, 1958    H. E. SMITH    2,854,733
APPARATUS FOR SAWING ELONGATED STOCK
Filed May 23, 1955    9 Sheets-Sheet 5

INVENTOR
HAROLD E. SMITH
BY James E. Toomey
ATTORNEY

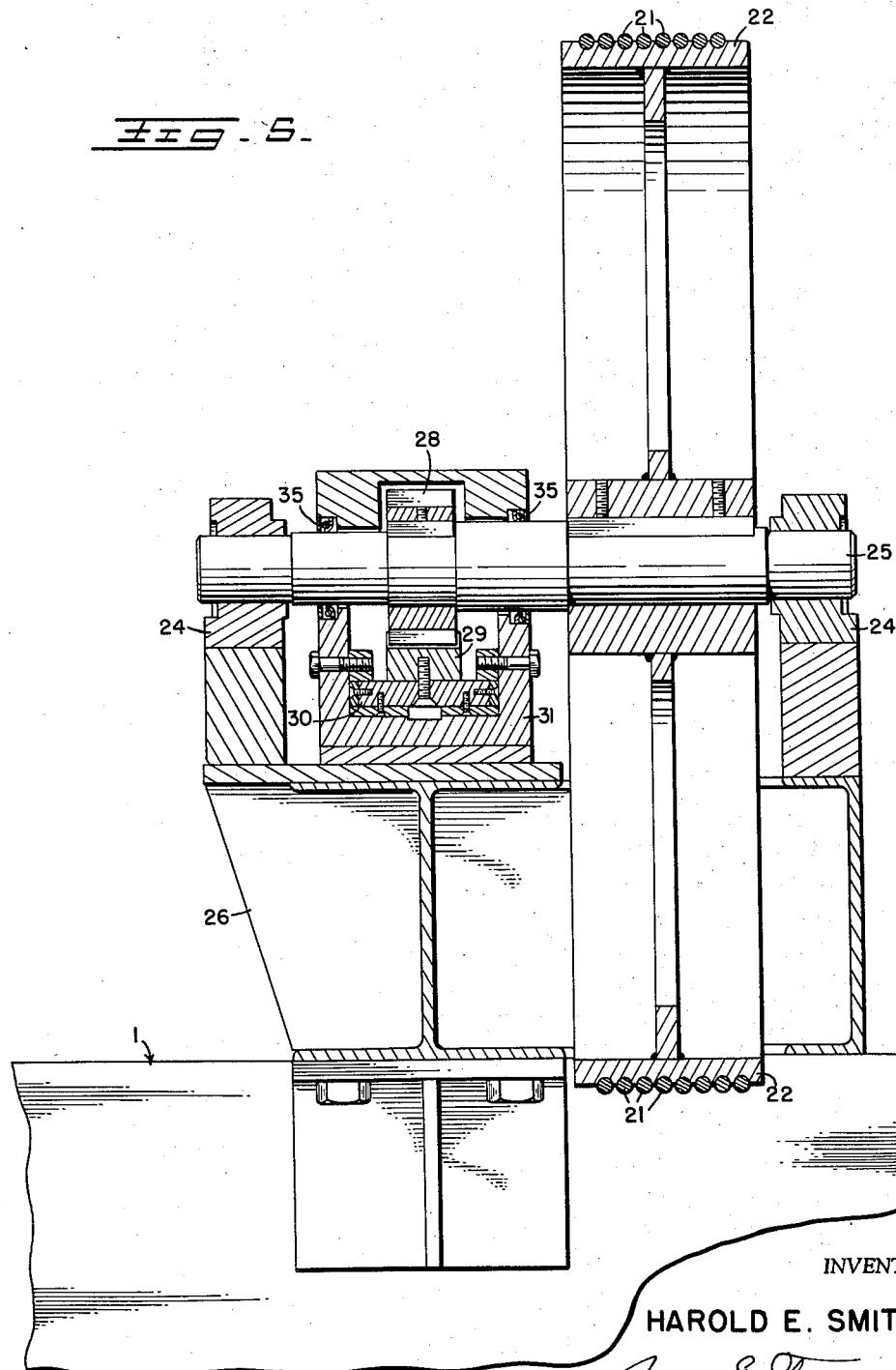

Oct. 7, 1958 H. E. SMITH 2,854,733
APPARATUS FOR SAWING ELONGATED STOCK
Filed May 23, 1955 9 Sheets-Sheet 7

INVENTOR
HAROLD E. SMITH
BY James E. Toomey
ATTORNEY

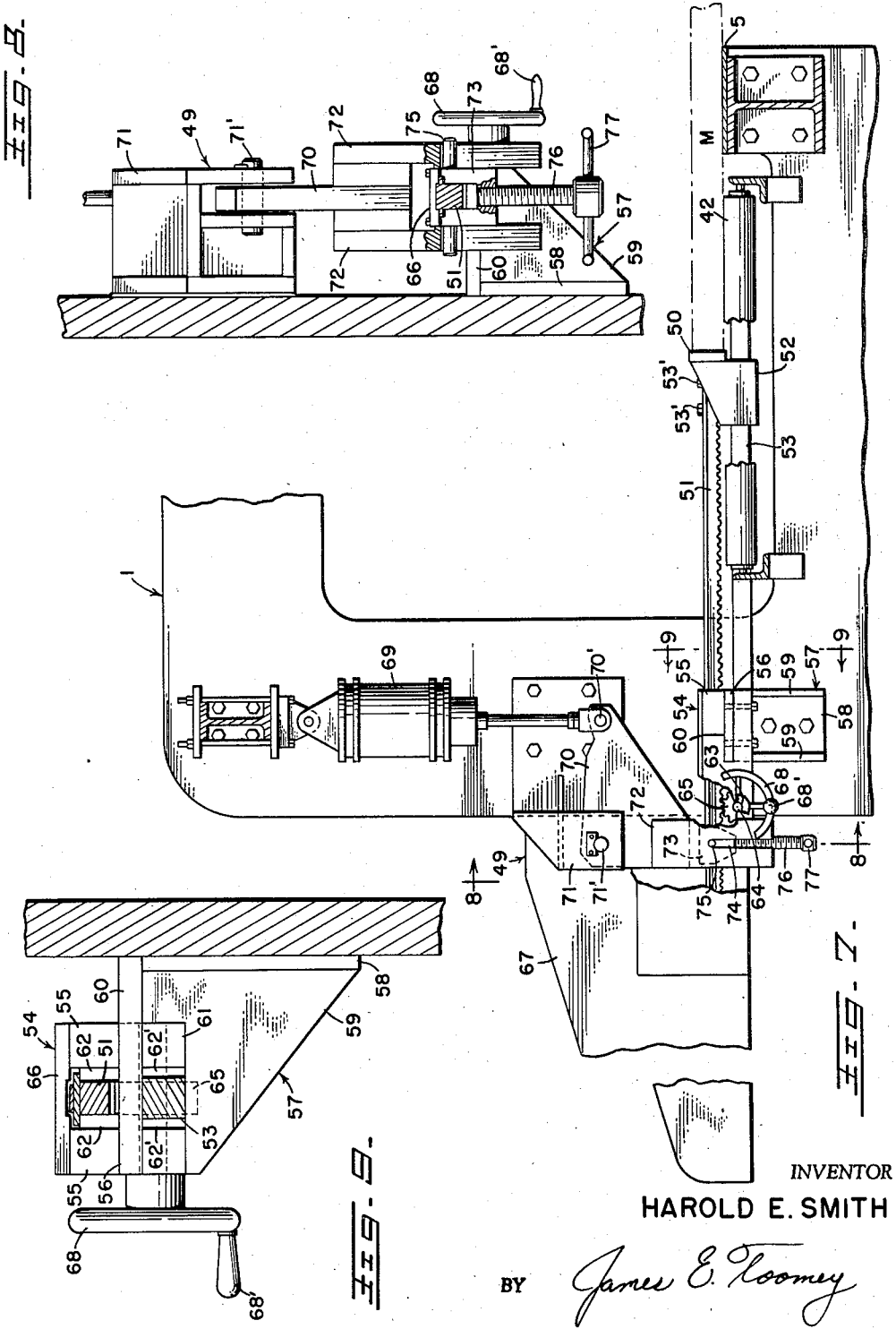

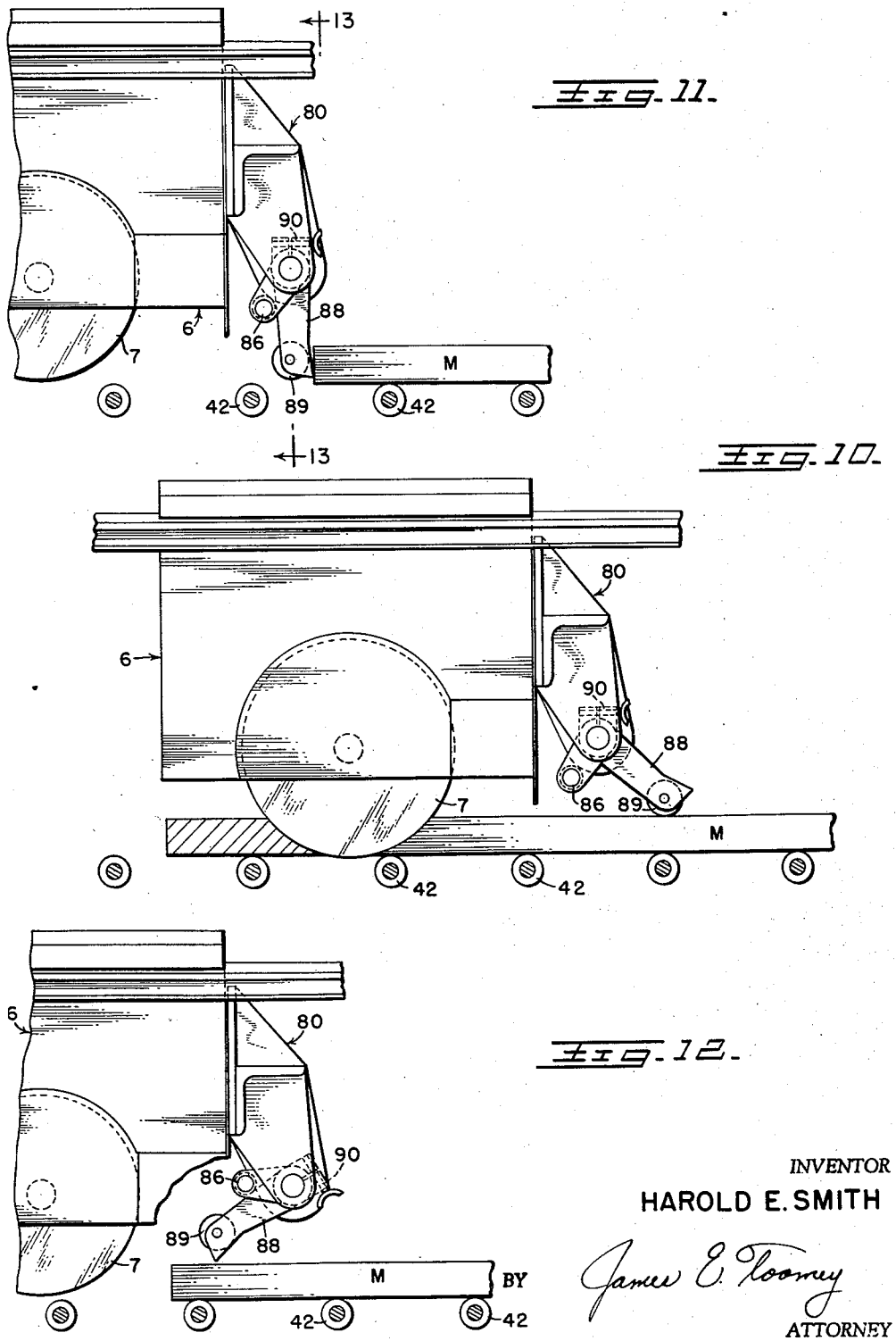

United States Patent Office 2,854,733
Patented Oct. 7, 1958

2,854,733

APPARATUS FOR SAWING ELONGATED STOCK

Harold E. Smith, Veradale, Wash., assignor to Kaiser Aluminum & Chemical Corporation, Oakland, Calif., a corporation of Delaware Application May 23, 1955, Serial No. 510,107

10 Claims. (Cl. 29—69)

This invention relates to a sawing device. More particularly, it is concerned with providing a novel and efficient device for the sawing of elongated stock, e. g. metal.

In the sawing of elongated metal stock into long strips difficulty is experienced with the known sawing devices in attaining accurate sawing of the metal stock, particularly when the stock is of substantial length, for example on the order of 10 or more feet. Also, most of the known sawing devices are fabricated from large steel castings which would be prohibitive in cost for fabricating a saw of extensive length, for example on the order of 30 or more feet. Furthermore, the usual means employed for moving the saw or cutter member lengthwise of the metal stock are limited in their accuracy when sawing stock of substantial length. Examples of common means for moving the saw or cutter member are direct drive screw feed mechanisms and hydraulic cylinder mechanisms. Both of these means are impractical when sawing metal stock of a length greater than about ten feet. A sawing device employing a screw feed for feeding the saw through the metal stock is impractical for a machine exceeding about ten feet in length since the screw can be supported only at its ends. Such a screw tends to sag and when employed for long lengths the degree of deviation is appreciable resulting in inaccurate sawing. A hydraulic type feed mechanism comprising a hydraulic cylinder, a piston within said cylinder, and a rod having one extremity affixed to the saw is weak in structure for sawing metal stock of long length resulting in inaccurate sawing. Too, a hydraulic type feed mechanism has a further disadvantage in that the hydraulic cylinder, in order to provide full travel for the saw, has to be as long as the longest metal stock that it would be desired to saw. This requires that additional floor space in amount equal to the length of the cylinder be provided for the sawing device. Further, many of the prior art saw devices have the saw and motor assembly mounted below the work whereby cooling liquid splashes on the motor creating maintenance problems.

Therefore, it is a primary object of this invention to provide a novel sawing device for accurately severing elongated metal stock of long length.

It is a further object of the invention to provide a novel device for sawing stock wherein there is provided a suspended saw assembly and wherein movement of said saw assembly for sawing as well as pushing the severed metal stock from the sawing device is provided by a novel and efficient hydraulically actuated rack and pinion assembly.

It is another object of the invention to provide a novel device for sawing elongated metal stock constructed from similar incremental units which facilitates easy lengthening of the sawing device for accommodating longer metal stock.

Another object of the invention is to provide a novel device for sawing elongated metal stock into strips, which is so constructed that the various component parts may be made of light, easily fabricated elements.

It is also an object of the invention to provide a novel device for sawing elongated metal stock which is so constructed that it requires a minimum amount of floor space within which to operate.

It is a further object of the invention to provide a device for sawing elongated metal stock constructed from similar incremental units wherein the incremental units are economically fabricated from standard structural shapes.

It is another object of the invention to provide in a device for sawing elongated metal stock a pusher means, for removing severed metal stock from the sawing device, having a safety means for preventing damage to the sawing device upon jamming of the severed metal stock.

It is also an object of the invention to provide in a device for sawing elongated metal stock a back stop means for stopping and aligning the metal stock being conveyed into the sawing device wherein the back stop means may be retracted after sawing to allow the severed metal stock to be removed from the sawing device.

Other objects and advantages of the invention will be more apparent from a review of the ensuing detailed description when taken in conjunction with the drawings.

In the accompanying drawings, forming a part of this specification, and in which like numerals are employed to designate like parts throughout the same:

Figure 1, comprising Figures 1a and 1b, shows a top plan view of a sawing device embodying the instant invention.

Figure 2, comprising Figures 2a and 2b, is a side elevational view of the device shown in Figures 1a and 1b.

Figure 3 is an end elevational view of the device shown in Figure 2a and taken along the line 3—3 of Figure 2a.

Figure 4 is an expanded longitudinal sectional view of a hydraulically actuated rack and pinion assembly used in the instant invention taken along the line 4—4 of Figure 1a and having certain parts broken away for clarity.

Figure 5 is an expanded vertical sectional view taken along line 5—5 of Figure 2a showing the hydraulically actuated rack and pinion assembly used in conjunction with a pulley for imparting movement to the saw assembly of the instant invention.

Figure 7 is an expanded view showing a back stop mechanism for use with the sawing device with certain parts broken away.

Figure 8 is an expanded vertical sectional view of the clamping device of the back stop mechanism, shown in Figure 7 and taken along the line 8—8 of Figure 7.

Figure 9 is an expanded view partially in section of the manual control for the backstop mechanism taken along the line 9—9 of Figure 7.

Figure 10 is an expanded elevational view of the saw assembly and pusher mechanism attached thereto as shown in Figure 2a, with the exception that the pusher mechanism is shown as positioned during the sawing of metal stock.

Figure 11 is an expanded partial elevational view of the saw assembly and pusher mechanism as shown in Figure 10 with the pusher mechanism as positioned for pushing severed metal stock.

Figure 12 is an expanded partial elevational view similar to Figure 11, of the saw assembly and pusher mechanism showing the pusher mechanism in inoperative position caused by accidental jamming of the severed metal stock.

Figure 1A:
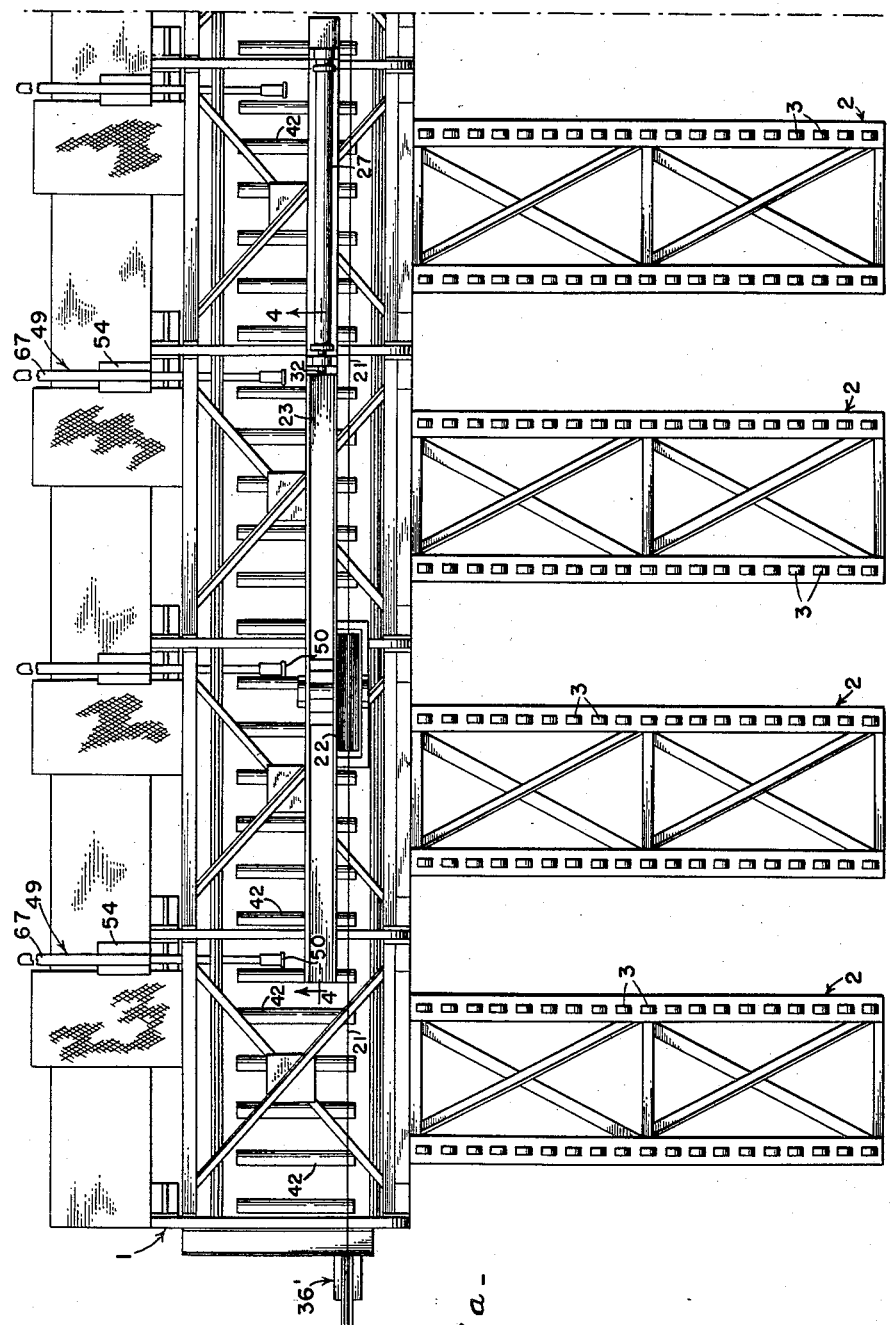

Referring to Figures 1 (1a and 1b), 2 (2a and 2b) and 3, the sawing device embodying the instant invention comprises, in general, a suitable elongated upstanding framework 1, horizontal rollers 42 supported by framework 1, supplemental frames 2 adjacent to a long side of elongated framework 1, and rollers 3 supported by supplemental frame members 2. The rollers 42 and rollers 3 have their upper surfaces substantially in the same plane. The elongated stock to be sawed lengthwise may be fed sideways over rollers 3 across a lower clamping surface 5 onto rollers 42, the plane determined by the uppermost surfaces of horizontal rollers 42 and the clamping surface 5 forming a work supporting surface for the stock. Any suitable clamping means can be employed for clamping the metal stock to the clamping surface 5; however, a preferred means, as shown in the figures, is the employment of hydraulic clamps 4 affixed to framework 1. Hydraulic clamps 4 are actuated by suitable hydraulic fluid pressure means (not shown) to clamp the metal stock between the lower surfaces of said clamps 4 and clamping surface 5 thereby holding the metal stock in a fixed position for sawing.

A run out table is preferably provided for receiving the severed metal stock after it has been pushed on the horizontal rollers 42 as will be hereinafter described. A suitable run out table adjoining an extremity of elongated framework 1 is shown in Figures 1b and 2b wherein 110 designates the run out table and 111 the horizontal rollers suitably affixed thereto. Horizontal rollers 111 are positioned at a level substantially equal to that of horizontal rollers 42 of elongated framework 1 in order that the severed metal stock may be easily conveyed.

Elongated upstanding framework 1, as shown in the Figures 1 and 2, is preferably formed by joining together a plurality of similar incremental units which units are fabricated from a plurality of structural members, such as beams and plates, etc., rather than of castings. This is advantageous in that, if it is desired to lengthen the sawing device to adapt it to accommodate longer stock, this can be easily accomplished by bolting one or more incremental units onto one of the ends of the elongated framework. This type of construction is further advantageous over a sawing device formed of heavy castings from the standpoint of initial cost.

Figure 6:
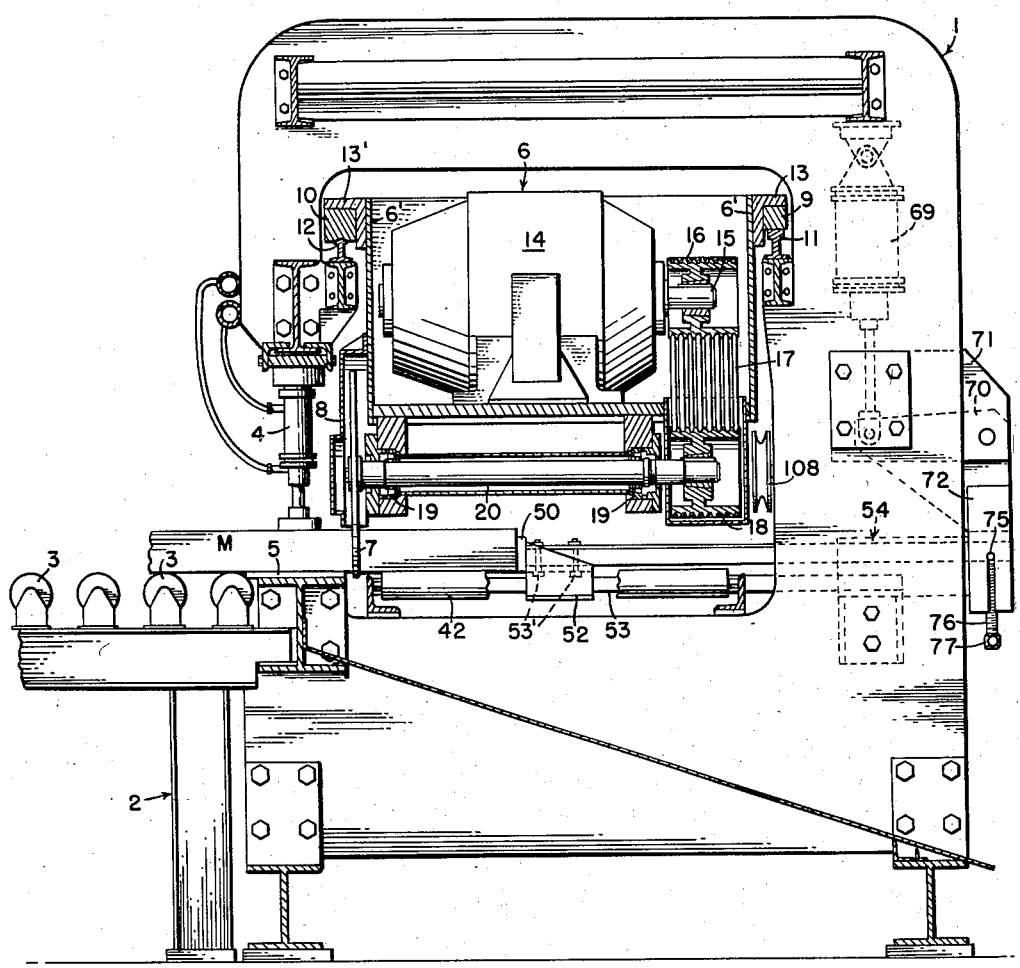
Figure 6 is an expanded vertical sectional view taken along the line 6—6 of Figure 2a and showing details of the saw assembly.

A motor driven saw assembly 6 is shown generally in Figures 1b and 2a and in detail in the sectional view of Figure 6. Saw assembly 6 generally comprises a movable frame 6', an electric motor 14, a shaft 20, a circular saw blade 7, and a saw blade guard 8. Saw blade 7 is affixed to one extremity of shaft 20, said shaft being mounted in bearings 19. The extremity of shaft 20 opposite that upon which saw blade 7 is mounted has a sheave 18 connected thereto. Saw blade 7, by means of sheave 18, is driven by a set of V-belts 17 from a sheave 16 mounted on shaft 15 of motor 14. Electric power can be supplied to motor 14 by any suitable means, such as a suitable power cable payed off from a reel, such as reel 106 shown in Figures 1b and 2b.

Suitable flanges 13 and 13' are affixed to frame 6' said flanges 13 and 13' being conveniently supplied by suitably joining angle beams onto frame 6' as shown in Figure 6. Slidable bearing blocks 9 and 10 are suitably affixed to flanges 13 and 13' respectively. In Figure 6 bearing block 9 is shown having a flat surface on its lower portion which rides or slides on the flat surface of rail 11, said rail 11 suitably affixed to elongated framework 1. Bearing block 10, having an inverted V-shape, rides or slides on a V-shaped rail 12 which is suitably affixed to elongated framework 1 on the opposite side from rail 11 but parallel thereto. Thus, saw assembly 6 may be moved from one end of elongated framework 1 to the other by sliding along parallel rails 11 and 12 which extend parallel with and in the same direction as the work supporting surface. Saw assembly 6, when positioned on rails 11 and 12, is substantially above the work supporting surface which, as hereinbefore mentioned, is defined by clamping surface 5 and the uppermost surfaces of horizontal rollers 42. A portion of saw blade 7, however, preferably extends to a short distance below said work supporting surface such that it may cut through the metal stock. In order that saw blade 7 may extend to a distance below the above-mentioned work supporting surface without damaging the rollers 42 or the clamping surface 5, clamping surface 5 is suitably positioned such that there is a space between the clamping surface 5 and the neighboring ends of the rollers 42 as shown in Figure 6. Movement of saw blade 7 through the metal stock (designated as M in the drawings) is effected by movement of saw assembly 6 on rails 11 and 12 which in turn is effected by movement of cable 21 shown in Figures 1 and 2. Each end of saw assembly 6 has an end of cable 21 suitably affixed thereto such that the movement of the lower portion of cable 21, as shown in Figure 2 to the right will cause assembly 6 to move to the right sliding on rails 11 and 12. Similarly, movement of the lower portion of cable 21 to the left will cause saw assembly 6 to move to the left. The portion of cable 21 to the left of saw assembly 6 as shown in Figure 2 passes to the left extremity of elongated framework 1 at which extremity is affixed a pulley assembly 36' comprising pulleys 36 and 37, said cable passing around pulleys 36 and 37 and then to the right to pulley 22. Cable 21 is wrapped around pulley 22 several times after which cable 21 continues on to the right to a second pulley assembly 38' suitably affixed to the right extremity of elongated framework 1, said pulley assembly 38' comprising pulleys 38 and 39. Cable 21 passes around pulleys 38 and 39 after which it then passes horizontally to the left to saw assembly 6 where the end of cable 21 is suitably affixed to saw assembly 6.

Air operated cylinder 200 shown in Figure 2 mounted on the top of elongated framework 1 at the right extremity thereof is attached to the top of pulley assembly 38' by pin 201. The lower end of pulley assembly 38' is pivotally affixed to the extremity of the elongated framework 1 by means of pin 202. Air operated cylinder 200 connected to a suitable air pressure source (not shown) is employed to remove any slack that may arise in cable 21 through usage.

Cable 21 is caused to move, in one direction or the other, by rotation of pulley 22, which rotation can be derived from any suitable source of power. It is preferred to effect the rotation of pulley 22 by a hydraulically actuated rack and pinion mechanism as shown generally in Figures 1 and 2 and in more detail in Figures 4 and 5. The rack and pinion mechanism is shown suitably mounted on beam 26, said beam 26 being suitably mounted on the top of elongated framework 1 in such manner that the longitudinal axis of beam 26 is parallel to the longitudinal axis of elongated framework 1. The rack and pinion mechanism comprises, in general, a hydraulic cylinder 27, an oil filled enclosed rack assembly 23, a piston rod 32, and a pinion 28 which is suitably connected to pulley 22 by means of pinion shaft 25. The oil filled enclosed rack assembly 23, shown generally in Figure 2 and in more detail in the sectional view shown in Figure 4, comprises essentially a rack 29, a base 30 for rack 29, said base fitting snugly within housing 31 and slidable by means of oil contained in said housing 31 along the bottom of housing 31. In the location where rack 29 engages pinion 28, shown in detail in Figure 5, housing 31 is extended upwardly to enclose pinion 28 and a portion of pinion shaft 25.

Rack 29 and pinion 28 is preferably completely enclosed by housing 31 for protection and for maintaining proper lubrication of rack 29 and pinion 28. In order to exclude air and moisture, rod 32 affixed to rack 29 passes into housing 31 through a seal 34 and similarly pinion shaft 25 passes into and out of housing 31 through seals 35. One extremity of rack 29 and rack base 30 is suitably affixed to piston rod 32, said piston rod passing out of housing 31 through seal 34 and thence into cylinder 27. Piston rod 32 has a suitable piston 33, shown in dashed lines in Figure 2a, at the extremity remote from rack 29 and base 30. Piston 33 is of a diameter such that a close fit is maintained between the outer periphery of piston 33 and the inside surface of cylinder 27 such that when oil is pumped from a suitable source (not shown) into cylinder 27 through pipe 40 said oil can force piston 33 and piston rod 32 to the left as shown in Figure 2a. A second pipe 41 is positioned at the opposite extremity of cylinder 27 such that as oil passing into cylinder 27 through pipe 40 forces piston 33 to the left the oil on the left side of piston 33 trapped within cylinder 27 may exit through pipe 41. Thus, when piston 33 has been forced to the left as far as possible it may be returned to its original position by reversing the oil flow by a suitable reversing valve, not shown, whereby oil is pumped in through pipe 41 and allowed to flow out of pipe 40. As piston rod 32 is moved to the left by forcing oil through pipe 40, rack 29, which engages the teeth of pinion 28, causes pinion 28 and pinion shaft 25 to rotate clockwise as shown in Figure 2a. Pinion shaft 25 is supported by bearings 24 which are suitably supported on elongated framework 1.

Suitable affixed to pinion shaft 25 and outside of housing 31 is pulley 22 which has a considerably larger diameter than pinion 29, for example, the ratio of the diameter of pulley 22 to that of pinion 29 may be 5:1.

Cable 21 is wrapped several times around pulley 22 and then passes from each side of pulley 22, the left portion passing around pulleys 36 and 37 of pulley assembly 38' located at the right extremity of elongated framework 1. The two ends of said cable 21 are respectively attached to two opposite ends of the saw assembly 6. Thus, as rack 32 is moved in a horizontal direction, a horizontal movement is imparted to the saw carriage 6 by cable 21. Since the ratio of the diameters of pulley 22 to pinion 28 is large, the translatory or horizontal motion of saw carriage 6 will be proportionately large relative to the travel of rack 29. For example, if the ratio between the diameter of pulley 22 to pinion 28 is 5:1 the translatory motion of saw carriage 6 will be 5 times as long as the travel of rack 29 and, consequently, the travel of piston 33. This permits the hydraulic cylinder 27 to be only ⅕ as long as the longest sheet or plate which can be sawed by the apparatus.

In Figure 1b and Figure 2b, at the right extremity of elongated framework 1 is shown a conventional hose reel 105 and electric cable reel 106 which are suitably affixed to beam members 107 shown affixed to the top of elongated framework 1. Hose reel 105 pays off coolant liquid hose 105' to the saw assembly 6 to supply liquid coolant from a suitable soure (not shown) to the sawing operation. Electric cable reel 106 pays off electric cable 106' to supply electric power to motor 14 of saw assembly 6. Cables 105' and 106', which are only partially shown in Figures 1b and 2b, pass over support rollers 108 affixed to elongated framework 1 and are suitably affixed to saw assembly 6. Both hose reel 105 and electric cable reel 106 automatically wind and maintain constant tension on hose 105' and cable 106', respectively.

Back stop mechanisms 49 which function as the means for stopping and aligning the metal stock as the stock is moved onto the horizontal work supporting surface are shown generally in Figures 1 and 2. More particular detail of an individual back stop mechanism is shown in Figures 7, 8 and 9. In general stop mechanism 49 comprises a stopping plate 50, a rack 51 on the end of which said stopping plate 50 is suitably affixed, said stopping plate 50 being transverse to the longitudinal dimension of said rack 51, and guide plates 52 affixed to either side of rack 51 and just behind stopping plate 50. The extremity of rack 51 having stopping plate 50 affixed thereto is supported by a guide bar 53 and flat head bolts 53' (shown in Figure 6), the heads of bolts 53' resting in contact with the upper surface of said guide bar 53. The cross section of guide bar 53 is rectangular and of such width that guide plates 52 on either side of rack 51 are in contact with either side of guide bar 53. The remaining portions of rack 51 are supported within a sub-assembly 54. Sub-assembly 54 comprises two side plates 55 each having an elongated slot 56 open at one end thereof. Side plates 55 are supported by a suitable bracket 57 comprising a vertical plate 58, web plates 59 and a horizontal plate 60. Bracket 57 is assembled with web plates 59 welded at right angles to the ends of vertical plate 58. The upper portion of web plates 59 are provided with cutout portions 61 to provide for the lower portions of vertical side plates 55. Horizontal plate 60 is suitably joined, such as by welding, to the top edge of vertical plate 58 and the portion of the top edge of web plates 59 which has not been cut out. Side plates 55 are then suitably joined, such as by welding, in spaced relation to fit in the cut out portion of web plates 59 and also to have horizontal plate 60 pass through elongated slots 56.

The inner faces of side plates 55 have inside plates 62 and 62' suitably attached thereto. Plates 62 are attached at the upper portion of the opening between the two side plates 55 which is above horizontal plate 60 while plates 62' are attached below horizontal plate 60. The height of plate 62 is somewhat less than the height of this upper portion of the opening in order that rack 51 will fit smoothly therein. It will be noted in Figure 9 that the upper portion of said opening above horizontal plate 60 has a T-shaped cross section similar to the T-shaped cross section of rack 51. Thus, rack 51 is supported within this upper opening by horizontal plate 60. Side plates 55 have holes 63 to provide for a shaft 64 upon which a pinion 65 is mounted. Sub-assembly 54 is assembled with pinion 65 on shaft 64 which passes through holes 63. Rack 51 is fitted within the upper T-shaped space above horizontal plate 60 with the teeth pointed downward and engaging the teeth of pinion 65.

Guide bar 53 fits within the space between side plates 55 below horizontal plate 60 and above the cut out portion 61 of web plates 59. Guide bar 53 extends from sub-assembly 54 across elongated framework 1 between a set of rollers 42. As can be seen from Figure 7 guide bar 53 cannot extend entirely through sub-assembly 54 since pinion 65 is in the way. Sub-assembly 54 is completed by having cap plate 66 bolted down over the upper edges of side plates 55 and rack 51. Sub-assembly 54 is then bolted to the elongated framework 1. Rack 51 extends for a substantial distance through said sub-assembly 54 away from elongated framework 1 and is covered by a suitable protective housing 67 which extends out from the elongated framework 1. Pinion shaft 64 has a suitable hand wheel 68 attached to one extremity thereof. A handle 68' is attached to said hand wheel 68. By rotating handle 68', rack 51 may be adjusted to horizontally position stopping plate 50 at any desired position across elongated framework 1.

In order to quickly retract stopping plates 50 from the desired stopping position in order to facilitate removal of the metal stock, an air cylinder such as air cylinder 69 shown in Figure 7 is provided. The lower extremity of the piston rod of air cylinder 69 is pivotally attached by pin 70' to one extremity of an angle plate lever 70. Angle plate lever 70 is pivotally attached by pin 71' to a suitable bracket 71 which in turn is attached to elongated framework 1. The opposite arm of angle plate lever 70 has side plates 72 suitably affixed such as by bolts to either side thereof. The portion of side plates 72 remote from the portions attached to angle plate lever 70 have slots 74 running a substantial part of the length of said plates 72 and opening to the edge remote from said bolted portion of plates 72. A suitable clamp assembly 73 having pins 75 on either side thereof is clamped onto rack 51 in such a position that pins 75 may engage slot 74 of side plate 72 when the air cylinder 69 is in its retracted position as shown in Figure 7. In this position side plates 72 are substantially vertical. When air pressure is applied to the upper portion of air cylinder 69, the piston thereof (not shown) moves downwardly thereby moving the extremity of the horizontal arm of angle plate lever 70 substantially downward in an arcuate path. This causes side plates 72 to move substantially to the left with reference to Figure 7 but in an arcuate path. When this occurs, pins 75 are also forced to move to the left by side plates 72 thereby moving rack 51, to which said pins 75 are clamped, to the left as well as moving stopping plate 50 to the left. The operation of the stopping mechanism is in the following manner.

The clamp assembly 73 is loosened up by loosening the threaded shaft 76 at the bottom thereof through handle 77 with air cylinder 69 in the retracted position and side plates 72 in the vertical position. Loosening of said clamp assembly 73 permits movement of rack 51 freely to the left or right through said clamp. The position of stopping plate 50 is then set by turning pinion 65 by manual operation of handle 68'. When stopping plate 50 is placed in the desired position, clamp assembly 73 is then tightened upon rack 51 whereby rack 51 is prevented from movement by clamp assembly 73, pins 75, slots 74 and side plates 72. The metal stock to be sawed may then be guided into the sawing device across horizontal rollers 42 until the edge of said plate contacts stopping plates 50. The metal stock is then sawed after which air pressure is applied to each air cylinder 69 which actuates angle plate levers 70 as previously described thereby moving racks 51 to the left (with reference to Figure 7) and retracting stopping plates 50. The severed metal stock is then free of stopping plates 50 and may be pulled or pushed along the horizontal rollers 42 of the elongated framework 1 by any suitable means, such as the pusher mechanism described hereinbelow.

Figure 13:
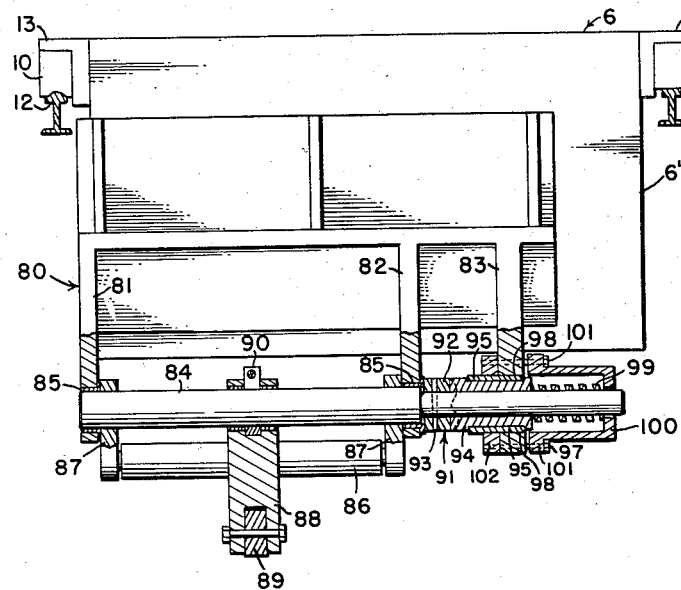
Figure 13 is an expanded vertical sectional view of the pusher mechanism and also shows a safety device which allows movement of the pusher mechanism to the position shown in Figure 12 and taken along the lines 13—13 of Figure 11.
Figure 3:
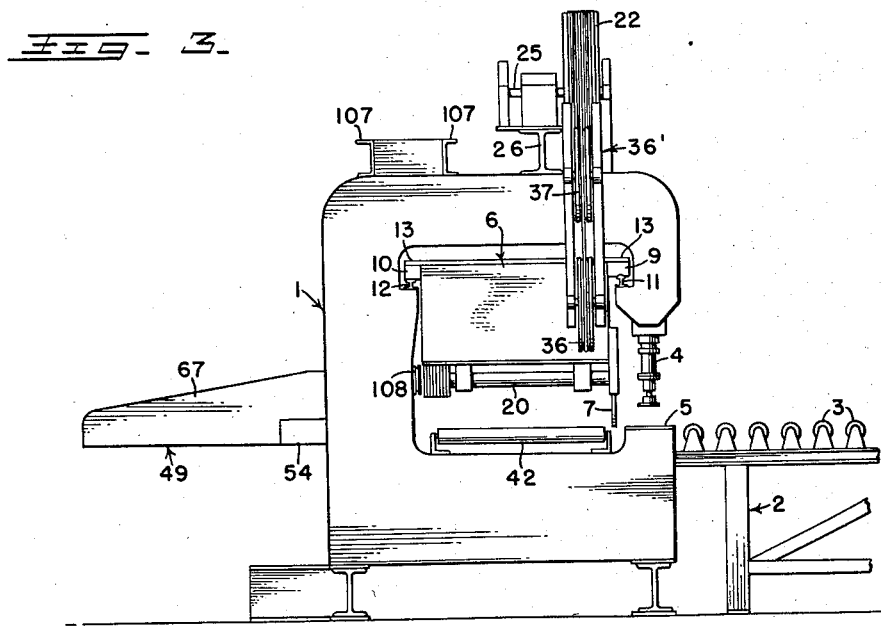

Figures 10, 11, 12 and 13 show a suitable device for removing the severed metal stock from the elongated framework 1. As shown generally in Figure 2a and in detail in Figures 10, 11, 12, and 13 the pusher mechanism 80 is mounted on the trailing side of saw assembly 6. As shown in Figure 13 pusher mechanism 80 comprises three substantially vertical arms 81, 82 and 83 affixed to the frame 6' of the saw assembly 6. A shaft 84 passes through and is supported by bearings 85 in arms 81 and 82. To the right of arm 82 the diameter of said shaft 84 is reduced. As said shaft 84 is mounted in arms 81 and 82 in bearings 85, said shaft 84 may be free to rotate therein. A pusher bar 86 is supported from shaft 84 by suitable members 87 which are affixed at their upper ends to shaft 84 in such manner that when shaft 84 rotates said members 87 move thereby shifting the position of pusher bar 86. A suitable pusher arm 88 has an opening at one extremity thereof through which shaft 84 passes, bearings or other suitable means being provided in said opening to permit pusher arm 88 to move freely and independently in a circular path about shaft 84. The lower extremity of pusher arm 88 has a suitable roller 89 rotatably mounted thereon near the rear portion thereof. The upper portion of pusher arm 88 through which shaft 84 passes is forked whereby a gap is provided. A clamp or lock 90 fits within said gap whereby the position of pusher arm 88 may be fixed lengthwise along shaft 84 while being free to move in a circular path relative to shaft 84.

In normal operation, during sawing and pushing of metal stock, pusher bar 86 is positioned as indicated by its position in Figures 10 and 11. However, a ratchet clutch mechanism 91, shown in Figure 13, is provided as a safety device whereby an excessive force against said bar 86 will move it counter-clockwise to the position shown in Figure 12. The clutch mechanism 91 operates in the following manner.

The left-hand jaw 92 is affixed to shaft 84 by a suitable pin 93 such that rotation of shaft 84 will result in rotation of left jaw 92. The right jaw 94 of clutch 91 has a circular opening in the center thereof through which shaft 84 may pass and rotate freely without rotating right jaw 94. An opening is provided in vertical arm 83 of the same diameter as the outside diameter of right jaw 94 to support said right jaw 94. Right jaw 94 is keyed to vertical arm 83 by key members 95 which fit within suitable keyways 97 in right jaw 94 and keyways 98 in vertical arm 83. The keyways 98 in vertical arm 83 pass entirely through said arm 83 thereby permitting right jaw 94 to move from left to right. Resistance to movement to the right is provided by a suitable spring 99 which fits around shaft 84. A suitable spring housing 100 is provided to prevent spring 99 from moving to the right. Spring housing 100 is held in position by bolts 101 passing through vertical arm 83 and being threadedly engaged with a suitable ring 102 which fits around right jaw 94 and has suitable keyways provided therein to permit passage of keys 95.

During sawing, saw assembly 6 and frame 6' move to the left as shown in Figure 10, and since pusher arm 88 is free to move counterclockwise about shaft 84 said pusher arm 88 moves in a counterclockwise arc up and over the top surface of the metal stock M when the pusher arm 88 or the roller 89 thereof contacts the edge of the metal stock. After the metal stock has been sawed pusher arm 88 drops freely down to a vertical position, as shown in Figure 11, after it passes over edge of said metal stock. Then, upon movement of the saw assembly 6 to the right, the lower edge of pusher arm 88 contacts the edge of the metal stock. Since pusher arm 88 is in contact with pusher bar 86 pusher arm 88 cannot move in a clockwise direction and thus cannot slide up and over the surface of the metal stock. Thus, the metal stock will be pushed along horizontal rollers 42 by pusher arm 88 as it moves to the right as shown in Figure 11. If the metal stock, while being pushed, should go off at an angle and run into one of the vertical members of elongated framework 1, safety clutch mechanism 91 will be actuated and permit pusher bar 86 to move to the position shown in Figure 12, thereby allowing pusher arm 88 to move up and over the metal stock and thus preventing damage. In clutch mechanism 91, shown in Figure 13, right jaw 94 is forced against left jaw 92 by spring 99. Left jaw 92 is held in position by vertical arm 82. Since members 87 supporting pusher arm 88 are affixed to shaft 84, pusher bar 86 cannot move without rotating shaft 84. Under normal load, shaft 84 is prevented from rotating in the clockwise direction by the configuration of the jaws 92 and 94 of the clutch mechanism 91 and by the pressure of spring 99. However, it will be noted that the crests of said jaws 92 and 94 are rounded and by exertion of a substantial force left jaw 92 can rotate in a clockwise direction by forcing right jaw 94 to the right against the pressure of spring 99 and moving over the rounded crests of right jaw 94. Thus, if the severed metal stock becomes jammed during movement along the horizontal rollers 42, the force will move pusher arm 88 and pusher bar 86 in a clockwise direction to the position shown in Figure 12. By the proper choice of configuration of the matching surfaces of left jaw 92 and right jaw 94, the counterclockwise rotation to return pusher bar 86 to the normal position can be provided to require less pressure than the clockwise rotation of said pusher bar 86. Thus, said pusher bar 86 may be easily returned to the normal position as shown in Figures 10 and 11 in order that normal operation may be resumed.

In the operation of the described sawing device, an elongated metal stock member can be placed by means of a suitable hoisting apparatus onto the rollers 3 of supplemental frame members 2. The member is moved sideways on rollers 2 across clamping surface 5 and onto the horizontal rollers 42 of elongated framework 1 and against stopping plates 50 which have previously been set for proper alignment of the member. Hydraulic clamps 4 are then actuated downwardly thereby contacting the upper surface of the member and clamping and thereby rigidly holding said member between said hydraulic clamps 4 and the clamping surface 5. By suitable controls, hydraulic fluid is then pumped into pipe 40 forcing piston 33 to the left (with reference to Figure 2) and in turn forcing rack 29 to the left. This causes pinion 28 and shaft 25 to move clockwise thereby also actuating pulley 22 in a clockwise manner. This causes cable 21 to pass off to the right from pulley 22 and to wind up on pulley 22 from the left. The left hand portion of cable 21 in turn passes around pulleys 36 and 37 of pulley assembly 36' to the saw assembly where it is affixed, thereby pulling saw assembly 6 to the left. Movement to the left of the saw assembly is permitted by the right hand portion of cable 21, since this portion of cable 21 is being payed off from pulley 22 to the right passing around pulleys 38 and 39 of pulley assembly 38' after which this portion of the cable moves to the left. Thus as piston 33 moves to the left, saw assembly 36 and saw blade 7 moves to the left thereby cutting through the metal member from right to left. Upon completion of the travel of the saw assembly 6 to the left, that is, upon completion of the sawing of the metal member, a reversing valve (not shown) can be actuated by suitable controls, to reverse the flow of hydraulic fluid to hydraulic cylinder 27 such that the hydraulic fluid is pumped in through pipe 41 and out pipe 40 thereby moving piston 33 to the right and consequently, moving saw assembly 6 to the right. In movement of saw assembly 6 to the right, pusher arm 88, which has dropped down into the vertical position after the sawing operation, pushes the severed metal stock along horizontal rollers 42 off onto the rollers 111 of the run out table 110 where the severed stock can be removed. Clamps 4 can then be raised and the metal stock moved sideways onto horizontal rollers 42 for the next sawing operation.

It is obvious that many changes or modifications may be made without departing from the scope and spirit thereof and accordingly, the invention is not limited by what has been disclosed in the foregoing description but only by the appended claims wherein what is claimed is:

1. In an apparatus for sawing and handling workpieces comprised of elongated metal stock, an elongated framework, said framework including a work supporting surface comprised of selected groups of roll members having their periphery so disposed as to define a horizontal surface, one of said groups of roll members being disposed such that a workpiece supported thereon may move laterally of said framework in a horizontal plane, the other of said groups of roll members being disposed such that a work product supported thereon may be moved in a direction perpendicular to that in which said workpiece may be moved, said surface further including an elongated planar area interposed between said selected groups of roll members to which said workpiece may be clamped, a saw means disposed on said framework above said work supporting surface and moveable along said framework such as to traverse said surface in a direction paralleling the direction of elongation of said framework, said saw means acting to sever a portion from said workpiece as it traverses said framework in one direction and including means acting to remove the work product so formed from said supporting surface as it traverses said framework in the opposite direction.

2. An apparatus as defined in claim 1, wherein said framework is comprised of a plurality of identical incremental units removably fixed one to the other.

3. An apparatus for sawing and handling metal stock as defined in claim 1, wherein said elongated framework includes further, means disposed above the elongated planar area defining said clamping surface interposed between said groups of roller members said means being movable into and out of engagement with a workpiece to clamp said workpiece on said planar clamping surface to prevent accidental displacement thereof as said saw means traverses the work supporting surface to sever a work product from said workpiece.

4. An apparatus for sawing and handling metal stock as defined in claim 1 including workpiece positioning means movable with respect to said work supporting surface, said means serving to stop movement of a workpiece laterally of said elongated framework at a predetermined position thereof with respect to said clamping surface, means adjustably fixing said positioning means with respect to said clamping surface said means including further means to retract said positioning means after said saw means has traversed said framework in one direction such that a work product may be moved from said work supporting surface by said saw means as it traverses said framework in the opposite direction, said positioning means returning to its workpiece stopping position after removal of the work product.

5. An apparatus for handling and sawing of metal stock as defined in claim 1, wherein said saw means includes a traversing carriage provided with a workpiece engaging member adapted to engage and move a work product when traversing said framework in one direction only.

6. An apparatus for handling and sawing of metal stock as defined in claim 1, wherein said framework is provided with means engaging said saw means and acting to traverse said saw means along said framework.

7. An apparatus for sawing and handling a planar workpiece comprising a flat plate of metal stock comprising an elongated frame means, said frame means including a flat elongated clamping surface for clamping a workpiece, said elongated clamping surface being disposed parallel to the direction of elongation of said frame means, roll means disposed to either side of said flat clamping surface, a traversing saw means disposed above said clamping surface and movable thereover lengthwise of said elongated frame, drive means for traversing said saw means along said framework, a work product engaging means depending from said saw means, clamping means depending from said framework, said clamping means being disposed above said clamping surface and closely adjacent the line of travel of said saw means; said roll means defining a first conveying surface for supporting a workpiece and facilitating movement thereof onto said clamping surface in direction normal to that along which said saw means traverses the said frame, and a second conveying surface facilitating movement of a work product away from said clamping surface and said saw means after said saw means has traversed said frame means in one direction and movement thereof in the opposite direction causes engagement of said work product engagement means with said work product.

8. A metal stock handling and sawing apparatus as defined in claim 7 wherein said frame means includes a pair of parallel laterally spaced rail means disposed above and to either side of said clamping surface, and said saw means includes a carriage in engagement with and guided by said rail means.

9. An apparatus for sawing and handling a planar workpiece as defined in claim 7 wherein said work product engaging means comprises a spring biased finger element depending from said saw means, said finger element being retractable by engagement with said workpiece as said saw means traverses said frame in one direction and being locked when said saw means traverses said workpiece in the opposite direction whereby a work product severed from said workpiece during initial traverse of said saw means in said first mentioned direction may be removed from said work supporting surface in a direction normal to that direction in which said workpiece is moved beneath said saw means.

10. An apparatus for sawing and handling a planar workpiece as defined in claim 7 wherein said drive means for moving said traversing saw means along said framework comprises a rack and pinion means, said rack means being connected to and movable by a hydraulic motor means, spool means connected to said pinion means, cable means trained over said spool means and engageable with said saw means, the ratio between said spool means and said pinion means being in the order of 5 to 1.

References Cited in the file of this patent

UNITED STATES PATENTS

| | | |
|---|---|---|
| 2,550,201 | Parisi | Apr. 24, 1951 |
| 2,657,680 | Evans | Nov. 3, 1953 |
| 2,742,935 | Acton | Apr. 24, 1956 |
| 2,767,458 | Meier | Oct. 23, 1956 |

FOREIGN PATENTS

| | | |
|---|---|---|
| 577,398 | Germany | May 30, 1933 |